April 1, 1958     J. H. CHOUINARD     2,828,827
REVERSIBLE SULKY FOR POWER LAWN MOWER
Filed July 26, 1955     2 Sheets-Sheet 1
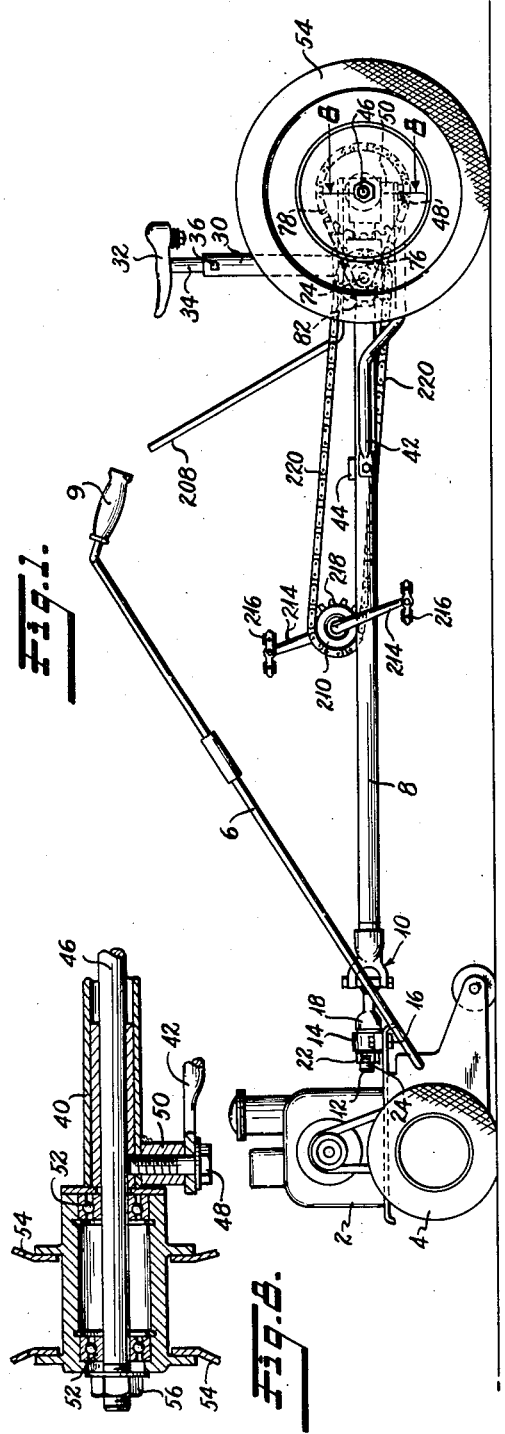
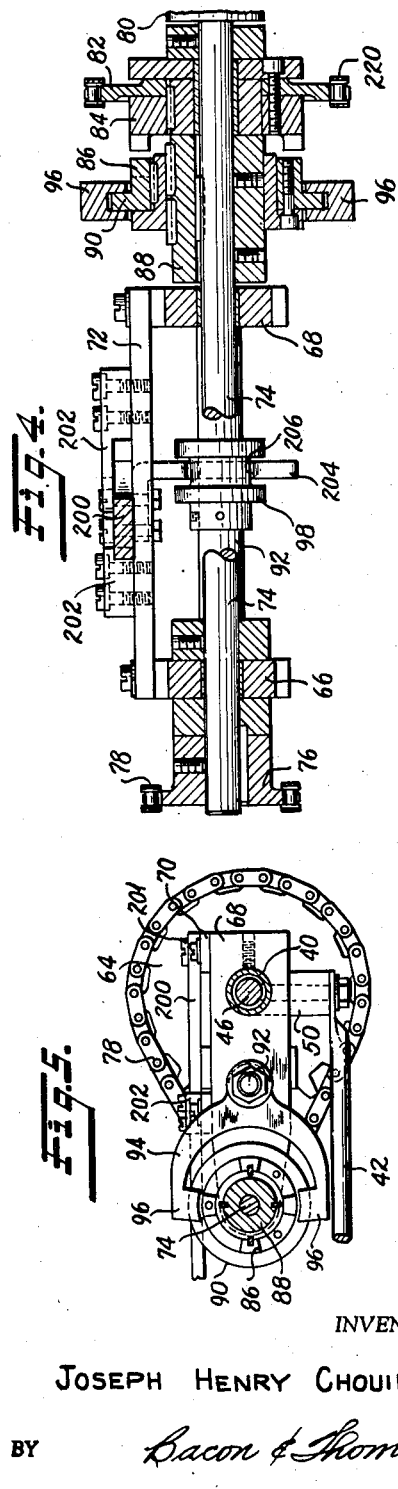
INVENTOR
JOSEPH HENRY CHOUINARD
BY *Bacon & Thomas*
ATTORNEYS April 1, 1958     J. H. CHOUINARD     2,828,827
REVERSIBLE SULKY FOR POWER LAWN MOWER
Filed July 26, 1955     2 Sheets-Sheet 2
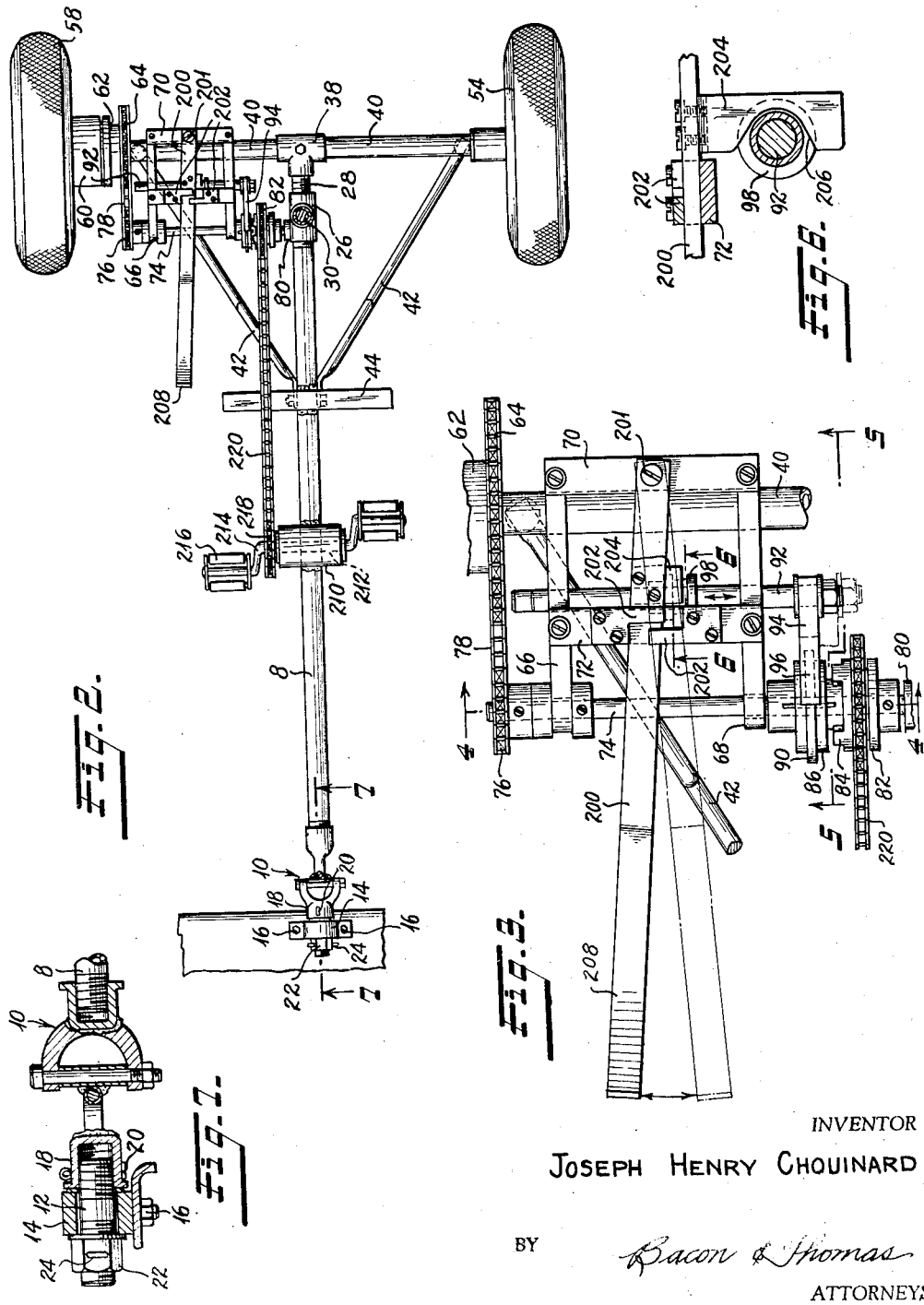
INVENTOR
JOSEPH HENRY CHOUINARD
BY *Bacon & Thomas*
ATTORNEYS United States Patent Office 2,828,827
Patented Apr. 1, 1958

2,828,827

REVERSIBLE SULKY FOR POWER LAWN MOWER

Joseph Henry Chouinard, East Hartford, Conn.

Application July 26, 1955, Serial No. 524,417

4 Claims. (Cl. 180—12)

This invention relates to a riding attachment or sulky for a power-driven implement, which may be a power lawn mower or the like.

In brief, the riding attachment of the present invention comprises a sulky frame having means for attachment to a power-driven implement through a universal joint. The sulky is supported by a pair of trailing ground wheels and provides a seat for the operator within easy reach of the implement controls. The riding attachment or sulky further includes pedal-operated drive means whereby the ground wheels of the riding attachment may be selectively driven by the operator to assist the traction drive of the implement or for other purposes to be hereinafter described. The driving arrangement for the sulky comprises a pair of pedal cranks and a chain drive to at least one wheel. The drive mechanism also includes a clutch that may be manually engaged or disengaged at will whereby the riding attachment will trail the power-driven implement freely during normal operation but wherein the clutch may be engaged whereupon the operator may, by operating the pedals, cause one or more of the sulky wheels to be driven in either direction.

While the drawings and description herein illustrate the sulky attached specifically to a power-driven lawn mower, it is to be understood that the lawn mower is merely illustrative of a type of implement with which the attachment may be employed. Clearly, other forms of power-driven implement may be combined with the attachment, as will be obvious.

It is, therefore, an object of this invention to provide a sturdy and economical riding attachment for power-driven implements.

It is another object of this invention to provide a riding attachment that normally trails freely behind the implement and which can be driven by the operator in either direction.

Still another object of this invention is to provide a normally trailing riding attachment provided with a selectively operable clutch and rider-operated drive means for the attachment.

A further object of this invention is to provide a riding attachment of the type described employing a novel drive and clutch arrangement.

Still further objects and advantages will become apparent to those skilled in the art as the description proceeds in connection with the accompanying drawings, wherein:

Fig. 1 is a side elevational view of a riding attachment according to the present invention shown attached to a power lawn mower;

Fig. 2 is a top elevational view of the attachment of Fig. 1 with the power mower shown in fragment and parts shown in section;

Fig. 3 is a fragmentary enlarged plan view of a part of the device shown in Fig. 2;

Fig. 4 is a vertical sectional view, on an enlarged scale, taken substantially along the line 4—4 of Fig. 3;

Fig. 5 is a vertical sectional view, on an enlarged scale, taken along the line 5—5 of Fig. 3;

Fig. 6 is an enlarged fragmentary sectional view taken along the line 6—6 of Fig. 3;

Fig. 7 is an enlarged vertical sectional view taken along the line 7—7 of Fig. 2; and Fig. 8 is a vertical sectional view on an enlarged scale taken on the line 8—8 of Fig. 1.

Referring first to Fig. 1, there is shown a conventional power lawn mower provided with a motor 2, traction wheels 4 and handle 6. The handle 6 is provided with the usual control instrumentalities (not shown) whereby the operator may control the operation of the power mower such as by disengaging a driving clutch and/or controlling the feed of fuel to the engine 2. These control means may comprise, for example, motorcycle handlebar grips 9 of conventional design and which are well-known in the art. The sulky or riding attachment comprises an elongated central frame member 8 (see also Fig. 2) which may comprise a length of pipe. At its forward end the central frame member 8 is secured to one member of a universal joint generally indicated at 10. The universal joint may be of the usual construction and operation. At its other end the universal joint is connected to a swivel pin 12 (see Fig. 7) journaled in a block 14 which is secured to the mower frame by bolts 16 or the like. The pin 12 is threaded into a socket 18 at the forward end of the universal joint 10 and locked therein by cotter key 20. The other end of the swivel pin 12, forwardly of the block 14, has a nut 22 threaded thereon and locked in place by cotter key 24. By this arrangement it will be obvious that the central frame member 8 may swing laterally or vertically about its point of attachment to the power mower or may swivel about the axis of pin 12 when in operation.

Adjacent its rearmost end the pipe 8 is secured in a T-coupling 26 (Fig. 2) and a nipple 28 is also secured in the T-coupling in alignment with the pipe 8. An upright pipe 30 is secured to the stem of the T-coupling and constitutes a support for a seat 32 which may be vertically adjustable in the upright pipe 30 by means of support rod 34 (Fig. 1) and set screw 36. The rearmost end of the nipple 28 is secured in the stem of a second T-coupling 38 and extending laterally therefrom are axle housing pipes 40.

Suitable diagonal braces 42 are secured to the central frame member 8 forwardly of its rearmost end and extend rearwardly and outwardly therefrom to positions adjacent the outer ends of the wheel support or axle housing 40 at which points they are attached to the axle housing to thus rigidly brace the frame of the riding attachment.

Somewhat forwardly of the seat 32, a transverse member 44 is welded or otherwise fixed to the central frame member 8 to constitute rests for the feet of the operator.

Extending through the axle housing 40 is an axle rod 46 (see Fig. 8) which may be locked in place therein by cap screws 48 which serve to attach the braces 42 to the axle housing 40 through the intermediary of spacers 50. Fig. 8 shows the wheel mounting for the wheel at the bottom of Fig. 2 and wherein suitable ball bearings 52 rotatably support the wheel 54. A nut 56, threaded to the outer end of the axle rod 46, secures the bearings 52 and wheel 54 on the attachment.

Referring now to Fig. 2, the upper wheel 58 is likewise journaled on the axle rod 46 by bearings (not shown) and has a hub 60 fixed thereto. The hub 60 serves to support a spacer and flange element 62 to which a sprocket wheel 64 is fixed.

Mounted on the axle housing 40 is a framework comprising side members 66 and 68 and transverse members 70 and 72 (see also Fig. 6). The side members 66 and 68 are provided, adjacent their forward ends, with aligned bearings in which a countershaft 74 is journaled. The countershaft 74 has a sprocket wheel 76 fixed thereon at its outer end in alignment with the sprocket wheel 64 fixed to wheel 58. A sprocket chain 78 is trained over aligned wheels 76 and 64. At its innermost end the countershaft 74 is journaled in a bronze bushing 80 which may be welded or otherwise rigidly secured to the central frame member of the attachment. Adjacent its innermost end the countershaft 74 has a sprocket wheel 82 journaled thereon. The outer face of the sprocket wheel is formed as a member of a dog clutch 84. Adjacent the clutch member 84 is a driven clutch member 86 complementary to the clutch member 84 and engageable therewith in a well-known manner. The clutch member 86 (see Fig. 4) is slidably keyed to a collar 88 fixed on the shaft 74 whereby the clutch member 86 is non-rotatable relative to shaft 74 but is freely slidable therealong. The clutch member 86 is provided with a peripheral flange 90. The side members 66 and 68, previously referred to, are also provided with aligned openings rearwardly of the shaft 74 and through which slide shaft 92 extends. The slide shaft 92 is free to slide axially of itself in the aligned openings and in a direction parallel to the shaft 74. Adjacent its inner end, the slide shaft 92 is provided with a fork 94 fixed thereon (see also Fig. 5). The fork 94 has bifurcated portions 96 loosely embracing the peripheral flange 90 of clutch member 86 at diametrically opposed points whereby axial shifting movement of the slide shaft 92 causes the clutch member 86 to be moved into engagement with or removed from engagement with clutch member 84. Between the side members 66 and 68 the shaft 92 is provided with a grooved collar 98 (see also Figs. 4 and 6). The collar 98 is rigidly fixed to the slide shaft 92. A clutch-actuating lever 200 is pivoted at 201 to the frame member 70 and extends forwardly in a generally horizontal direction over slide shaft 92, countershaft 74 and transverse member 72. Suitable hold-down members 202 are fixed to the transverse member 72 with portions thereof overlying the lever 200 for the purpose of preventing undesired displacement of the lever 200 in an upward direction. Fixed to the lever 200 is a downwardly extending bracket 204 (Fig. 6) having a notch 206 therein extending into the groove of the collar 98. Lateral swinging movement of the lever 200, acting through the notched bracket 204, thus causes shaft 92 to slide through side members 66 and 68 and causes actuation of movable clutch member 86. The lever 200 is preferably provided with an upwardly directed handle portion 208 extending upwardly to a position readily accessible to a person riding the attachment, on seat 32.

Forwardly of the foot rest 44 the central frame member 8 has a bearing housing 210 welded or otherwise securely fastened thereto. The bearing housing 210 is provided with suitable bearings (not shown) rotatably mounting a transverse shaft 212. Diametrically opposed pedal cranks 214 are rigid with the opposite ends of the shaft 212 and are provided with conventional pivoted pedals 216. The shaft 212 is further provided with a sprocket wheel 218 fixed thereon in alignment with the sprocket wheel 82 on countershaft 74. A sprocket chain 220 is trained over the aligned sprocket wheels 82 and 218 and provides a driving connection between the foot pedals 216 and the sprocket wheel 82.

From the foregoing description, it will be apparent that the rider of the attachment disclosed herein may, by manipulation of handle 208, disconnect the clutch members 84 and 86 and thus render the foot pedals ineffective to drive the wheel 58 and conversely render the wheel 58 perfectly free to roll. Thus, the rider may manipulate the controls of the power-driven implement to effect the normal and desired operation of that implement and permit the riding attachment to trail freely therebehind. The operator may, at any time, engage clutch members 84 and 86 and by operating the foot pedals 216 he may assist the power-driven implement in ascending inclines or in obtaining tractive force against unusual resistance. Furthermore, the power-driven implement may be normally operated substantially up to an obstruction. Normally, power-driven lawn mowers and like implements are provided with traction drives capable of propelling the implement only in a forward direction. Thus, when an obstruction is encountered, the implement motor cannot be employed for reverse drive to back the implement away from the obstruction. With the riding attachment of the present invention, however, the power-driven implement may be run right up to an obstruction and thereafter the operator may, by proper manipulation of the implement controls, disconnect the power drive to the implement wheels, operate the handle 208 to engage clutch members 84 and 86, and then by reversely rotating the pedals 216, he may actually drive the riding attachment in reverse and thus draw the implement away from the obstruction. Many other modes of operation and advantages will be apparent to the user of the attachment.

While a single specific embodiment of the invention has been shown and described herein, it is to be understood that the drawings and description are illustrative only and that other embodiments may be resorted to without departing from the scope of the invention as defined in the appended claims.

I claim:

1. A riding attachment for use with a power-driven implement, comprising an elongated control frame member, a universal joint for connecting one end of said central frame with said implement, a T-connector having one of its opposed ends connected with the other end of said control frame, a substantially hollow pipe having one of its ends fixedly secured to the stem of said T-connector and projecting substantially upright therefrom, a support rod telescoped within said pipe, a seat fixedly secured to the upper end of said rod, a nipple having one of its ends fixedly secured to the stem of a second T-connector, axle housings projecting laterally away from the opposed ends of said second T-connector, an axle rod disposed within said housings, a wheel mounted for rotation on each end of said axle, driving means supported on said central frame member and connected in driving relation with at least one of said wheels, and clutch means interposed between said driving means and said one wheel.

2. A riding attachment as defined in claim 1, and means mounted on said pipe engaging said rod to hold said seat in adjusted relation relative to said central frame member.

3. A riding attachment as defined in claim 1, and said driving means being reversible to selectively drive said one wheel in forward or reverse directions.

4. In combination: an implement having ground-engaging wheels driven by a suitable source of power mounted on said implement; a sulky removably connected behind said implement and having a seat thereon; means including a universal joint connecting said sulky to said implement; said sulky having a rear axle and ground wheels rotatably mounted at either end thereof; foot pedals mounted on said sulky and accessible from said seat; a transverse countershaft mounted adjacent said rear axle and drivingly connected to at least one of said rear wheels; drive means for rotation of said countershaft in response to actuation of said pedals; and clutch means mounted on said countershaft for selectively engaging or disengaging the drive between said pedals and said countershaft.

References Cited in the file of this patent

UNITED STATES PATENTS 447,334      Letiecq _____ Mar. 3, 1891

(Other references on following page)

UNITED STATES PATENTS

| | | |
|---|---|---|
| 1,575,618 | Burlingame | Mar. 9, 1926 |
| 1,713,396 | Rountree | May 14, 1929 |
| 1,856,255 | Johnson | May 3, 1932 |
| 1,962,013 | Griffoul | June 5, 1934 |
| 2,374,533 | Fulton | Apr. 24, 1945 |
| 2,657,621 | Kantz | Nov. 3, 1953 |
| 2,676,032 | Stegeman | Apr. 20, 1954 |
| 2,678,462 | Lison et al. | May 18, 1954 |
| 2,701,616 | Cooper | Feb. 8, 1955 |

FOREIGN PATENTS

| | | |
|---|---|---|
| 102,110 | Great Britain | Nov. 16, 1916 |